(12) United States Patent
Danis et al.

(10) Patent No.: US 11,348,378 B2
(45) Date of Patent: May 31, 2022

(54) TEST SPECIMEN FOR VALIDATING OPERATING PARAMETERS OF A METHOD FOR THE ADDITIVE MANUFACTURING OF A PART BY LASER MELTING ON POWDER BEDS

(71) Applicant: SAFRAN HELICOPTER ENGINES, Bordes (FR)

(72) Inventors: Yann Danis, Moissy-Cramayel (FR); Alexis Marchand, Moissy-Cramayel (FR); Aurèle Germain, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 483 days.

(21) Appl. No.: 16/495,634

(22) PCT Filed: Mar. 27, 2018

(86) PCT No.: PCT/EP2018/057751
§ 371 (c)(1),
(2) Date: Sep. 19, 2019

(87) PCT Pub. No.: WO2018/178065
PCT Pub. Date: Oct. 4, 2018

(65) Prior Publication Data
US 2020/0111269 A1 Apr. 9, 2020

(30) Foreign Application Priority Data
Mar. 27, 2017 (FR) ...................................... 1752523

(51) Int. Cl.
*B29L 31/40* (2006.01)
*G07C 3/14* (2006.01)
(Continued)

(52) U.S. Cl.
CPC ............ *G07C 3/143* (2013.01); *B29C 64/153* (2017.08); *B29L 2031/40* (2013.01); *B33Y 80/00* (2014.12)

(58) Field of Classification Search
CPC .... B22F 2999/00; B22F 5/10; B22F 2203/03; B22F 10/20; B22F 10/30; B33Y 50/02;
(Continued)

(56) References Cited

U.S. PATENT DOCUMENTS

2010/0174392 A1 7/2010 Fink et al.
2013/0112366 A1 5/2013 Mottin et al.
(Continued)

FOREIGN PATENT DOCUMENTS

FR 3029829 A1 6/2016

OTHER PUBLICATIONS

Written Opinion of the International Searching Authority dated Jun. 20, 2018, issued in corresponding International Application No. PCT/EP2018/057751, filed Mar. 27, 2018, 6 pages.
(Continued)

*Primary Examiner* — Moshe Wilensky
(74) *Attorney, Agent, or Firm* — Christensen O'Connor Johnson Kindness PLLC

(57) ABSTRACT

A test specimen for validating operating parameters of a method for the additive manufacturing of a part by laser melting on powder beds includes at least one upper face, at least one lower face and side faces, including a front side face and a rear side face that are substantially on opposite sides from one another. The test specimen has at least one recess opening onto the front and rear side faces, the recess having a substantially triangular cross sectional shape being delimited by three internal faces, including a first lower internal face oriented upwards, a second upper internal face oriented downwards, and a third upper internal face which
(Continued)

defines a narrow wall with one other of the side faces, which is inclined.

11 Claims, 2 Drawing Sheets

(51) Int. Cl.
*B29C 64/153* (2017.01)
*B33Y 80/00* (2015.01)

(58) Field of Classification Search
CPC ....... B33Y 10/00; B33Y 80/00; B29C 64/393; B29C 64/153; G01N 1/2806; B29L 2031/40; G07C 3/143
See application file for complete search history.

(56) References Cited

U.S. PATENT DOCUMENTS

| | | |
|---|---|---|
| 2014/0300017 A1 | 10/2014 | Wighton et al. |
| 2015/0219572 A1 | 8/2015 | Beuth, Jr. et al. |

OTHER PUBLICATIONS

International Preliminary Report on Patentability dated Oct. 1, 2019, issued in corresponding International Application No. PCT/EP2018/057751, filed Mar. 27, 2018, 1 page.
International Search Report dated Jun. 20, 2018, issued in corresponding International Application No. PCT/EP2018/057751, filed Mar. 27, 2018, 7 pages.

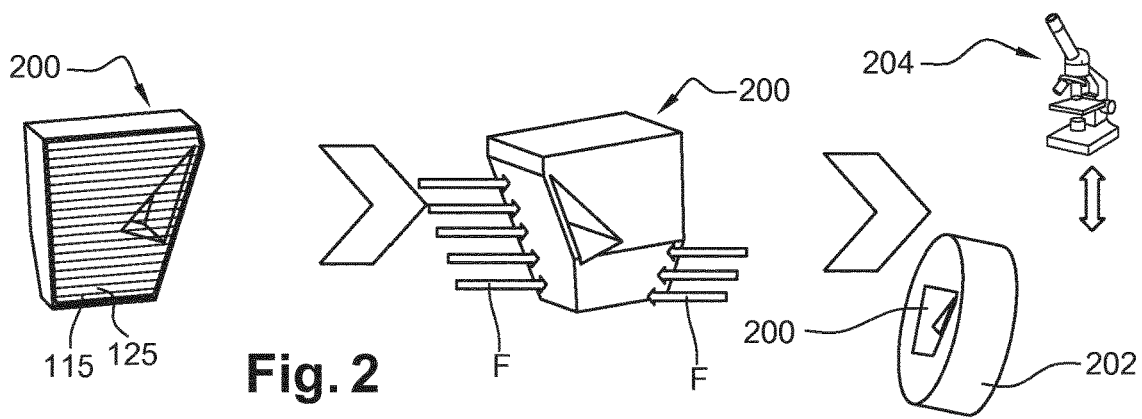
Fig. 2
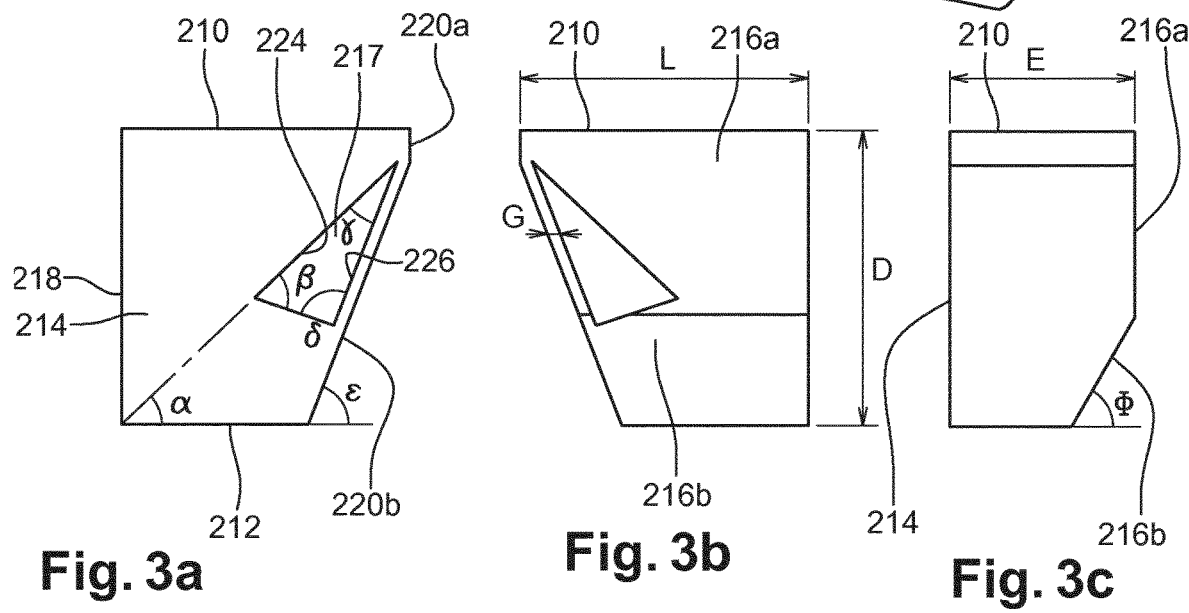
Fig. 3a  Fig. 3b  Fig. 3c
Fig. 3d
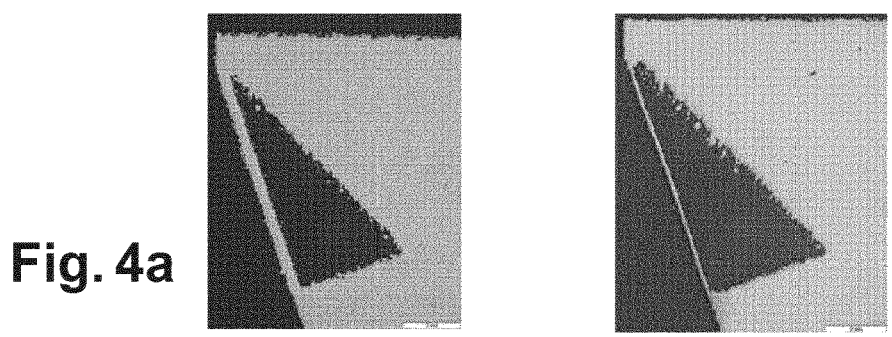
Fig. 4a  Fig. 4b

TEST SPECIMEN FOR VALIDATING OPERATING PARAMETERS OF A METHOD FOR THE ADDITIVE MANUFACTURING OF A PART BY LASER MELTING ON POWDER BEDS

TECHNICAL FIELD

This invention concerns a test specimen for validating operating parameters of an additive manufacturing method of a part by laser melting on powder beds.

BACKGROUND

The prior art includes patent applications published under the numbers FR-A1-3 029 829, US-A1-2013/112366, US-A1-2010/174392, US-A1-2014/300017 and US-A1-2015/219572.

The additive manufacturing, particularly by laser melting on powder beds, is an increasingly used method with many advantages. Before producing a part by additive manufacturing, it is necessary to define operating parameters, such as laser beam power, beam scanning speed, etc., that are specific to the material used. In the case of parts for the aeronautical industry, the material is generally a metal alloy and the additive manufacturing method is of the SLM type (Selective Laser Melting).

The operating parameters are defined in two steps. A first step consists in searching for parameters that allow to obtain a healthy material, with for example a material density close to 100%, an absence of lack of melting, an absence of cracks, etc. The second step consists in verifying that the part can be produced by additive manufacturing with the parameters chosen in the previous step and that the surface conditions obtained are satisfactory, in particular in risk areas, such as faces oriented downward (called downskin), faces oriented upward (called upskin), thin walls, etc.

If the results of the second step are not satisfactory, the first step should be repeated by changing the operating parameters. This is the case, for example, when the parameters for achieving the best material health are not adapted to the manufacture of downskin and upskin faces. In this case, a complete new iteration is necessary and this iteration is long and costly.

The large number of parameters studied generally implies evaluating the material health of a large number of samples in the first step. This evaluation is done by image analysis on a micrographic section, which makes this step tedious. In the current technique, the influence of operating parameters on material health is studied through the manufacture of test specimens in the form of cubes (typically 10×10×10 mm$^3$). In the second step, test specimens of more complex shapes are used to assess whether different shapes (thin walls, downskin, upskin, etc.) can be manufactured with the predefined parameters.

The disadvantage of this technique is the time required for the manufacture and metallographic analysis of each geometry and for each parameter. The plurality of tests generates a lot of time spent between successive iterations.

Indeed, the method for manufacturing by laser melting on powder beds has the advantage of being very reactive. However, in an industrial context of manufacturing of parts, the time spent on the development of construction parameters in laser melting limits the reactivity of this method for manufacturing.

The invention offers a simple, effective and economical solution to this problem.

DISCLOSURE OF THE INVENTION

At this end, the invention proposes a test specimen for validating operating parameters of a method for the additive manufacturing of a part by laser melting on powder beds, said test specimen being formed in one piece by additive manufacturing by laser melting on powder beds identical to that used for the part to be manufactured, said test specimen having at least one upper face, at least one lower face and side faces including front faces and rear faces substantially on opposite sides from one another, said test specimen further comprising at least one recess opening onto said front and rear side faces, said recess having a substantially triangular shape in cross-section and being delimited by three inner faces, including a first lower inner face oriented upwards, a second upper inner face oriented downwards, and a third upper inner face which defines a thin wall with one other of said side faces, which is inclined.

The step of identifying manufacturing parameters to obtain a dense and compliant material health is essential. It is therefore advantageous to develop solutions that reduce the industrial process of researching these parameters. For this purpose, we propose a new test specimen geometry that allows observing material health, as well as surface conditions and the manufacturability of certain particular shapes. The test specimen, which can be small in size, allows multiplying on the same production tray the number of sets of operating parameters evaluated and thus to have a very quick overview of the quality of the parameters tested in terms of material health, manufacturability, mass yield, etc.

The test specimen according to the invention may include one or more of the following characteristics, taken in isolation from each other or in combination with each other:

the test specimen comprises two distinct portions, respectively a solid portion and a thin or thinned portion having said recess, said lower and upper faces are at least partially substantially parallel;

said front and rear side faces are at least partially substantially parallel;

said front and rear side faces are connected by side faces at least partially substantially parallel;

said second face is inclined by an angle of about 45° with respect to said lower face and/or by an angle of about 25° with respect to said third face;

said first face is inclined by an angle of about 65° with respect to said second face and/or by an angle of about 90° with respect to said third face;

said inclined side face forms an angle of about 70° with said lower face;

said inclined side face is oriented downward;

said rear face comprises an upper portion substantially perpendicular to the upper face and a lower portion inclined by an angle of about 60° with respect to the lower face;

said recess opens onto said upper and lower portions of said rear face respectively.

According to the invention, the terms "substantially opposed", respectively "substantially parallel" or "substantially perpendicular" mean that the walls are opposed, respectively parallel or perpendicular, within the limit of the technical feasibility of the test specimen, i.e. within the limit of an angular deviation of +/−2° due to the manufacture of the test specimen.

The term "substantially triangular" means that the recess is triangular within the limits of the technical feasibility of the test specimen, i.e. by omitting the clearance angles due to the manufacture of the test specimen.

DESCRIPTION OF THE FIGURES

The invention will be better understood and other details, characteristics and advantages of the invention will appear by reading the following description with non-limitative example and with reference to the annexed drawings, in which:

FIG. 2 is a very schematic view of a test specimen according to the invention and shows the manufacturing and using steps of this test specimen, FIGS. 3a to 3d are other schematic views of the test specimen of FIG. 2, and FIGS. 4a and 4b are images obtained under the microscope of portions of test specimens according to the invention, made with different operating parameters.

DETAILED DESCRIPTION

Figure 1:
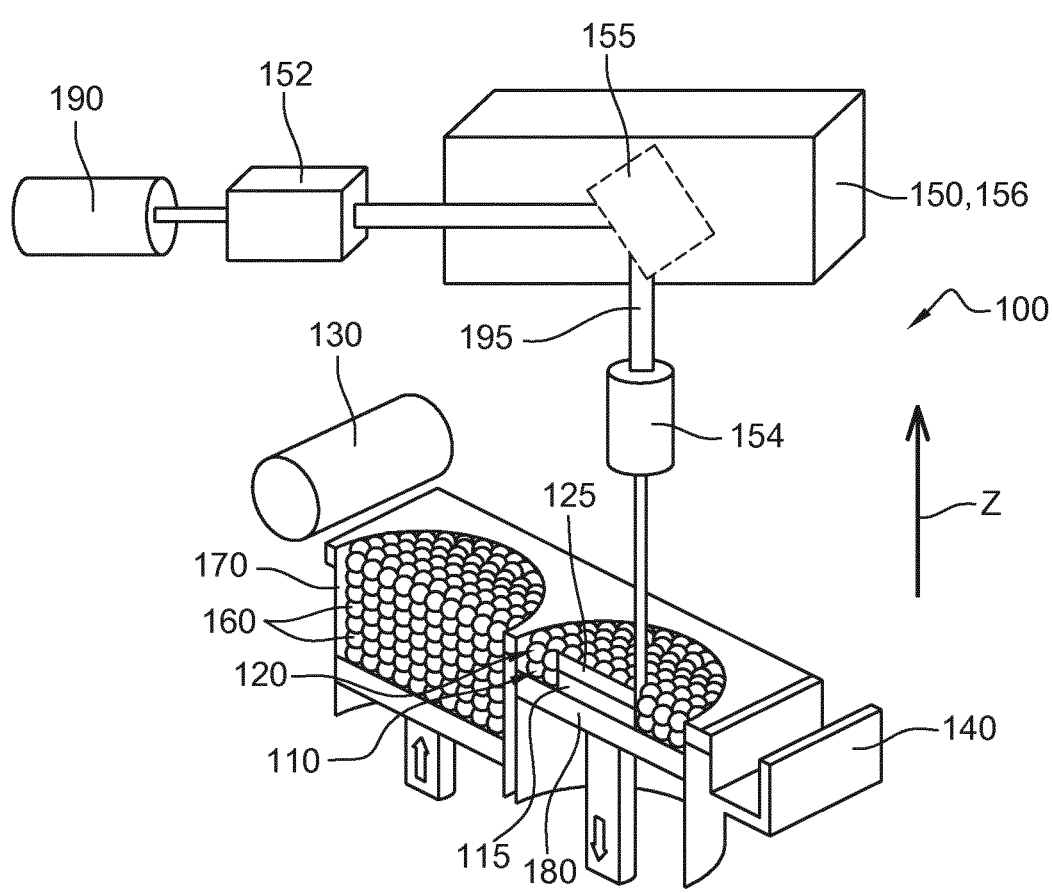
FIG. 1 is a very schematic view of an additive manufacturing machine.

FIG. 1 shows a machine for manufacturing a part by additive manufacturing and in particular by selective melting of powder layers by high energy beam.

The machine includes a feed tray 170 containing metal powder, a roller 130 to transfer this powder from this tray 170 and spread a first layer 110 of this powder on a construction support 180 (it can be a solid support, a portion of another part or a support grid used to facilitate the construction of certain parts).

The machine also includes a recycling bin 140 to recover a small part of the used powder (especially not melted or sintered) and most of the excess powder, after spreading the powder layer on the construction support 180. Thus, most of the powder in the recycling bin is new powder. Also, this recycling bin 140 is commonly referred to by the profession as an overflow bin or ashtray.

This machine also includes a laser beam 195 generator 190, and a control system 150 capable of directing this beam 195 to any region of the construction support 180 so as to scan any region with a layer of powder. The laser beam is shaped and its diameter is varied in the focal plane by means of a beam dilator 152 and a focusing system 154 respectively, the assembly constituting the optical system.

This machine can apply the method similar to a method of laser melting on a powder bed or SLM (Selective Laser Melting) on a powder and can use any high energy beam in place of the laser beam 195, as long as this beam is energetic enough to melt the powder particles.

The roller 130 can be replaced by another suitable dispensing system, such as a dispenser (or hopper) associated with a scraper blade, knife or brush, suitable for transferring and spreading the powder in a layer.

The control system 150 comprises, for example, at least one steerable mirror 155 on which the laser beam 195 is reflected before reaching a powder layer, each point of the surface of which is always at the same height with respect to the focusing lens, contained in the focusing system 154, the angular position of this mirror 155 being controlled by a galvanometric head so that the laser beam scans at least a region of the first powder layer, and thus follows a pre-established part profile.

The machine works as follows. A first layer 110 of powder of a material is applied with the roller 130 to the construction support 180, this powder is transferred from a feed tray 170 during a forward movement of the roller 130 and then scraped, and possibly slightly compacted, during one (or more) return movement(s) of the roller 130. The excess powder is recovered in the recycling bin 140. A region of this first layer 110 of powder is scanned with the laser beam 195 to a temperature higher than the melting temperature of this powder (liquidus temperature). The galvanometric head is controlled according to the information contained in the database of the computer tool used for the computer-aided design and manufacture of the part to be manufactured. Thus, the powder particles 160 of this region of the first layer 110 are melted and form a first cord 115 in one piece, integral with the construction support 180. The support 180 is lowered by a height corresponding to the already defined thickness of the first layer (between 20 and 100 µm and generally between 30 and 50 µm). The thickness of the powder layer to be melted or consolidated remains a variable value from one layer to the other because it is highly dependent on the porosity of the powder bed and its flatness, while the pre-programmed displacement of the support 180 is a value invariable within clearance. A second layer 120 of powder is then applied to the first layer 110 and to this first cord 115, and then a region of the second layer 20 which is partially or completely above this first cord 115 is heated by exposure to the laser beam 195, so that the powder particles of this region of the second layer 120 are melted, with at least part of the first element 15, and form a second cord in one piece or consolidated 125, these two cords 115 and 125 forming together one block in one piece. For this purpose, the second cord 125 is advantageously already fully connected as soon as a part of this second cord 125 is connected to the first element 115. This process of construction of the part layer by layer is then continued by adding additional layers of powder on the assembly already formed. The scanning with the beam 195 allows to construct each layer by giving it a shape in accordance with the geometry of the part to be made. The lower layers of the part cool down more or less quickly as the upper layers of the part are constructed.

In order to reduce the contamination of the part, for example, with dissolved oxygen, oxide(s) or another pollutant during its manufacture layer by layer as described above, this manufacture must be carried out in an enclosure with a controlled degree of hygrometry adapted to the method/material pair, filled with a neutral gas (not reactive) with regard to the material in question such as nitrogen (N2), argon (Ar) or helium (He) with or without the addition of a small quantity of hydrogen (H2) known for its reducing capacity. A mixture of at least two of these gases can also be considered. To prevent contamination, particularly by oxygen from the surrounding environment, it is usual to overpressure this enclosure.

Thus, depending on the current prior art, selective melting or selective laser sintering allows constructing low-polluted parts with good dimensional accuracy, whose three-dimensional geometry can be complex.

Selective melting or selective laser sintering on a powder bed also preferably uses powders of spherical morphology, clean (i.e. not contaminated by residual elements from synthesis), very thin (the size of each particle is between 1 and 100 µm and preferably between 45 and 90 µm), which allows obtaining an excellent surface finish of the finished part. The powder is preferably made of a metal alloy, for example nickel-based.

Selective melting or selective laser sintering also reduces manufacturing times, costs and fixed costs compared to a moulded, injected or machined part in the mass.

According to the invention, a part, for example an aeronautical part, is produced by additive manufacturing using the above-mentioned technique. To validate the operational manufacturing parameters of this part, a test specimen is also previously made by additive manufacturing with the same powder.

By manufacturing the test specimens for controlling the material health according to the model proposed below, it is possible in a single microscopic observation to determine if the laser melting parameters are suitable for the manufacture of the part, regardless of its geometry.

FIG. 2 shows additive manufacturing steps for the test specimen 200, layer by layer or cord by cord 115, 125 (left on the drawing). After manufacture, the test specimen 200 is measured for its surface state by probing, this probing being schematically represented by the arrows F. Finally, the test specimen 200 is individually embedded in a block 202, here cylindrical, for example in transparent resin, for observation by microscope 204. It is thus possible to visualize thin and massive portions of the test specimen 200.

FIGS. 3a to 3d show in detail the shapes and dimensions of the test specimen 200 according to the invention.

The test specimen 200 is formed in one piece by additive manufacturing by laser melting on powder beds. The powder used is identical to the one used for the part to be manufactured.

In the example shown, the test specimen 200 comprises at least one upper face 210, at least one lower face 212 and side faces 214, 216, 218, 220 of which front faces 214 and rear faces 216 are substantially opposite.

The test specimen 200 also comprises at least one recess 217 opening onto the front and rear side faces 214, 216. The recess 217 has an axis A substantially perpendicular to the planes passing through faces 214, 216. The recess 217 has a substantially triangular shape in cross-section (with respect to the axis A) and is delimited by three inner faces 222, 224, 226 of which a first lower inner face 222 faces upwards, a second upper inner face 224 faces downwards, and a third upper inner face 226 defines a thin wall 228 with another 220 of the side faces. The face 220 is inclined here.

The lower 212 and upper 210 faces are substantially parallel. The front side faces 214 and rear side faces 216 are at least partially substantially parallel. The front face 214 is flat here while the rear face 216 comprises two portions that are flat and inclined to each other. It comprises an upper portion 216a substantially perpendicular to the upper face 210 and a lower portion 216b inclined by an angle ϕ with respect to the lower face 212.

The front side faces 214 and rear side faces 216 are connected by the side faces 218, 220 which are at least partially substantially parallel. One 218 of these side faces is flat. The other 220 of the side faces comprises two flat portions that are inclined to each other. It comprises an upper portion 220a substantially perpendicular to the upper face 210 and a lower portion 220b inclined at an angle E to the lower face 212. The recess 217 opens onto the upper 216a and lower 216b of this rear face.

In the example shown:
the second face 224 is inclined by an angle α of about 45° with respect to the lower face 212 and by an angle γ of about 25° with respect to the third face 226,
the first face 222 is inclined by an angle β of about 65° with respect to the second face 224 and by an angle δ of about 90° with respect to the third face 226,
the inclined side face 220, 220b forms an angle ε of about 70° with the lower face 212, and
the lower portion 216b forms an angle ε of about 60° with the lower face 212.

In addition, the dimensions of the test specimen 200 proposed here have been chosen because they allow evaluating material health, manufacturability and mass yield in a reduced volume (around 10×10×10 mm$^3$). The dimension L between the face 218 and the portion 220a is about 12 mm, the dimension D between the faces 210, 212 is about 12 mm and the dimension E between the face 214 and the portion 216a is about 8 mm. The thin wall 228 can have a thickness between 0.45 mm and 0.7 mm (dimension G between the face 226 and the portion 220b). The thin wall 228 is preferably about 0.5 mm thick.

The test specimen 200 according to the invention presents as follows:
 a massive portion formed by the large part of its volume,
 a thin portion, i.e. the thin wall 228 built on a slope,
 upskin faces, i.e. the faces 222 and 226, and
 downskin faces, i.e. the faces 224 and 220

In addition, an upskin face 226 and a downskin face 220 are located on either side of the thin wall 228. These main forms allow evaluating, together with the sets of parameters tested, the overall spectrum of the feasibility of manufacturing all kinds of forms and therefore limit the risks of unpleasant surprises during the actual manufacture of the part.

The test specimen 200 has a large part of its volume without any particular difficulty. This volume allows controlling the material health representative of a massive portion of a part.

Among the most critical singular areas of laser melting manufacturing on powder beds can be cited:
 the areas constructed on slopes where successive layers have a part of melted powder based on unmelted powder from the previous layer. The angle ε of 45° for the thin wall 228 was chosen because it is generally associated with a natural construction limit without additional support,
 the thin wall 228 constructed on slopes is used to demonstrate that the choice of a set of construction parameters allows a good manufacturability of an area compiling two critical cases: a thin portion and an area constructed on the non-melted powder. The thickness G of 0.5 mm is interesting because this type of thickness is close to the limits of the additive manufacturing method.

Several angles on slopes, manufactured on non-melted powder, are present on this geometry, two of them are accessible for roughness measurements by probing methods, for example.

The metallographic analysis performed on the test specimen consists of measuring the apparent material density on the observed surface. In a second step, the roughness of the downskin and upskin faces are also evaluated. Finally, and as shown in FIGS. 4a and 4b, it is possible to quantify the response of the parameter set during the manufacture of the thin portions.

The invention thus allows accelerating and lighten a process that is inherently tedious in origin, yet remains absolutely essential to the development of construction parameters by laser melting method on powder beds.

In addition, it allows a limitation of the quantities of lost material, in the sense that this material is only used for the validation of manufacturing parameters and that it is not reusable for the manufacture of value-added parts. The reduction in the number of steps allows this saving. This gain reduces the industrial adjustment process of the manufacturing parameter set from 2 to 5 steps.

Finally, the design of the test specimen 200 was carried out with the objective of directly allowing a metallographic analysis by coating. The test specimen 200 does not need to be "redrawn" or "reduced in size", it is directly "coatable" and can be analyzed under a microscope (FIG. 2).

The invention claimed is:

1. A test specimen for validating operating parameters of a method for additive manufacturing of a part by laser melting on powder beds, the test specimen being formed in one piece by additive manufacturing by laser melting on powder beds, the test specimen comprising:
   at least one upper face;
   at least one lower face; and
   a plurality of side faces including a front side face, a rear side face, and a plurality of inclined side faces, the front side face and the rear side face being substantially on opposite sides of the test specimen from one another;
   at least one recess opening onto the front side face and the rear side face, the at least one recess having a substantially triangular cross sectional shape and being delimited by three inner faces, the three inner faces including a first lower inner face oriented upwards, a second upper inner face oriented downwards, and a third upper inner face which defines a thin wall with one inclined side face of the plurality of inclined side faces.

2. The test specimen according to claim 1, wherein the lower face and the upper face are at least partially substantially parallel.

3. The test specimen according to claim 1, wherein the front side face and the rear side face are at least partially substantially parallel.

4. The test specimen according to claim 1, wherein the front side face and the rear side face are connected by two at least partially substantially parallel side faces of the plurality of side faces.

5. The test specimen according to claim 1, wherein the second upper inner face is inclined by at least one of an angle ($\alpha$) of about 45° with respect to the lower face an angle (Y) of about 25° with respect to the third upper inner face.

6. The test specimen according to claim 1, wherein the first lower inner face is inclined by at least one of an angle ($\beta$) of about 65° with respect to the second upper inner face or an angle ($\delta$) of about 90° with respect to the third upper inner face.

7. The test specimen according to claim 1, wherein the one inclined side face of the plurality of inclined side faces forms an angle ($\varepsilon$) of about 70° with the lower face.

8. The test specimen according to claim 1, wherein the one inclined side face of the plurality of inclined side faces is oriented downward.

9. The test specimen according to claim 1, wherein the rear side face comprises an upper portion that is substantially perpendicular to the upper face and a lower portion that is inclined by an angle ($\varphi$) of about 60° with respect to the lower face.

10. The test specimen according to claim 1, wherein the at least one recess opens onto the upper and lower portions of the rear side face respectively.

11. A test specimen for validating operating parameters of a method for additively manufacturing a part by laser melting on powder beds, the test specimen being formed in one piece by additive manufacturing, the test specimen comprising:
    an upper face;
    a lower face; and
    a plurality of side faces including a front side face, a rear side face, and a plurality of inclined side faces, the front side face and the rear side face being substantially on opposite sides of the test specimen from one another;
    a triangular recess opening through the front side face and the rear side face, the triangular recess having a first inner face oriented toward the upper face, a second inner face oriented toward the lower face, and a third inner face oriented toward the upper face and defining part of a thin wall with one inclined side face.

* * * * *